United States Patent
Tanaka et al.

(10) Patent No.: US 11,142,258 B2
(45) Date of Patent: Oct. 12, 2021

(54) CABIN FRONT WALL STRUCTURE OF VEHICLE

(71) Applicant: Toyota Jidosha Kabushiki Kaisha, Toyota (JP)

(72) Inventors: Motoki Tanaka, Toyota (JP); Koji Saeki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 79 days.

(21) Appl. No.: 16/519,524

(22) Filed: Jul. 23, 2019

(65) Prior Publication Data

US 2020/0031402 A1    Jan. 30, 2020

(30) Foreign Application Priority Data

Jul. 25, 2018  (JP) .............................. JP2018-139509

(51) Int. Cl.
*B62D 25/14*    (2006.01)
*G05G 1/36*    (2008.04)

(52) U.S. Cl.
CPC .............. *B62D 25/14* (2013.01); *G05G 1/36* (2013.01)

(58) Field of Classification Search
CPC ........ B62D 25/14; B62D 25/08; B62D 25/16; G05G 1/36
See application file for complete search history.

(56) References Cited

U.S. PATENT DOCUMENTS

| 5,005,898 A | * | 4/1991 | Benedetto | B60R 13/083 |
| | | | | 296/191 |
| 2005/0015960 A1 | * | 1/2005 | Goetz | B62D 25/145 |
| | | | | 29/434 |
| 2012/0001455 A1 | * | 1/2012 | Naoi | B62D 25/14 |
| | | | | 296/193.09 |
| 2013/0093215 A1 | * | 4/2013 | Naoi | B62D 25/08 |
| | | | | 296/203.02 |
| 2016/0236714 A1 | * | 8/2016 | Tatsuwaki | B62D 25/2045 |
| 2020/0047817 A1 | * | 2/2020 | Tanaka | B62D 25/14 |

FOREIGN PATENT DOCUMENTS

| DE | 19845012 A1 | * | 4/2000 | ............ B62D 25/14 |
| FR | 2960202 A1 | | 11/2011 | |
| GN | 202765104 U | | 3/2013 | |
| JP | 2004-210100 A | | 7/2004 | |
| JP | 2006-082585 A | | 3/2006 | |
| JP | 2006082585 A | * | 3/2006 | |
| JP | 2008-269025 A | | 11/2008 | |

* cited by examiner

*Primary Examiner* — James A English
*Assistant Examiner* — Kurtis Nielson
(74) *Attorney, Agent, or Firm* — Dinsmore & Shohl LLP

(57) ABSTRACT

A cabin front wall structure of a vehicle includes a dash panel constituting a front wall of a cabin of a vehicle, an accelerator bracket attached to the dash panel, and used for mounting an accelerator pedal, a brake bracket attached to the dash panel at a position spaced from the accelerator bracket in a vehicle width direction, and used for mounting a brake pedal; and a brace (connection member) extending along a surface of the dash panel and configured to connect the accelerator bracket with the brake bracket.

2 Claims, 4 Drawing Sheets

CABIN FRONT WALL STRUCTURE OF VEHICLE

CROSS REFERENCE TO RELATED APPLICATION

This application claims priority to Japanese Patent Application No. 2018-139509 filed on Jul. 25, 2018, which is incorporated herein by reference in its entirely including the specification, claims, drawings, and abstract.

TECHNICAL FIELD

The present disclosure relates to a cabin front wall structure of a vehicle, and in particular relates to a portion of the structure to which an accelerator pedal and a brake pedal are attached.

BACKGROUND

A dash panel is arranged as a cabin front wall of a vehicle between a cabin of the vehicle and an engine compartment in which an engine and other components are mounted. A wall portion in front of a driver seat is equipped with an accelerator pedal and a brake pedal which are attached to the dash panel via an accelerator bracket and a brake bracket, respectively.

Here, JP 2006-82585 A discloses a structure in which an accelerator bracket and a brake bracket are integrated into one part, and the integrated part is attached to a dash panel. This is intended to allow the dash panel to be commonly used among vehicles even though pedals are disposed at different locations in the vehicles, and accordingly improve versatility of the dash panel.

Here, the driver seat of a vehicle is equipped with a steering handle, and a steering column is arranged so as to pass through the dash panel. For this reason, the dash panel has a through hole in which the steering column is inserted, which may result in a decrease in strength of the dash panel around the through hole.

The structure disclosed in JP 2006-82585 A uses the integral bracket in which attachment regions of an accelerator pedal and a brake pedal are closely located. Accordingly, the bracket of JP 2006-82585 A cannot sufficiently reinforce the dash panel.

SUMMARY

In an aspect, a cabin front wall structure of a vehicle according to the present disclosure includes a dash panel constituting a cabin front wall of the vehicle, an accelerator bracket attached to the dash panel, and used for mounting an accelerator pedal, a brake bracket attached to the dash panel at a position spaced from the accelerator bracket in a vehicle width direction, and used for mounting a brake pedal, and a connection member that extends along a surface of the dash panel and is configured to connect the accelerator bracket and the brake bracket.

In another aspect, the cabin front wall structure of a vehicle further includes a reinforcement member extending along the vehicle width direction while conforming to the dash panel, and the reinforcement member may be placed at a location where the reinforcement member overlaps with at least one of the accelerator bracket and the brake bracket.

In another aspect, the dash panel has a column hole into which a steering column is inserted, the accelerator bracket may be positioned on a right side of the column hole in the vehicle width direction, the brake bracket may be positioned on a left side of the column hole in the vehicle width direction, and the connection member may be positioned on an upper side of the column hole.

According to this disclosure, the connection member that connects the brake bracket and the accelerator bracket is disposed on the dash panel, which can lead to improvement in strength of the dash panel.

BRIEF DESCRIPTION OF DRAWINGS

An embodiment of the present disclosure will be described based on the following figures, wherein.

DESCRIPTION OF EMBODIMENT

Hereinafter, an embodiment according to the present disclosure will be described with reference to drawings. It should be noted that this disclosure is not limited to the embodiment described herein.

Figure 1:
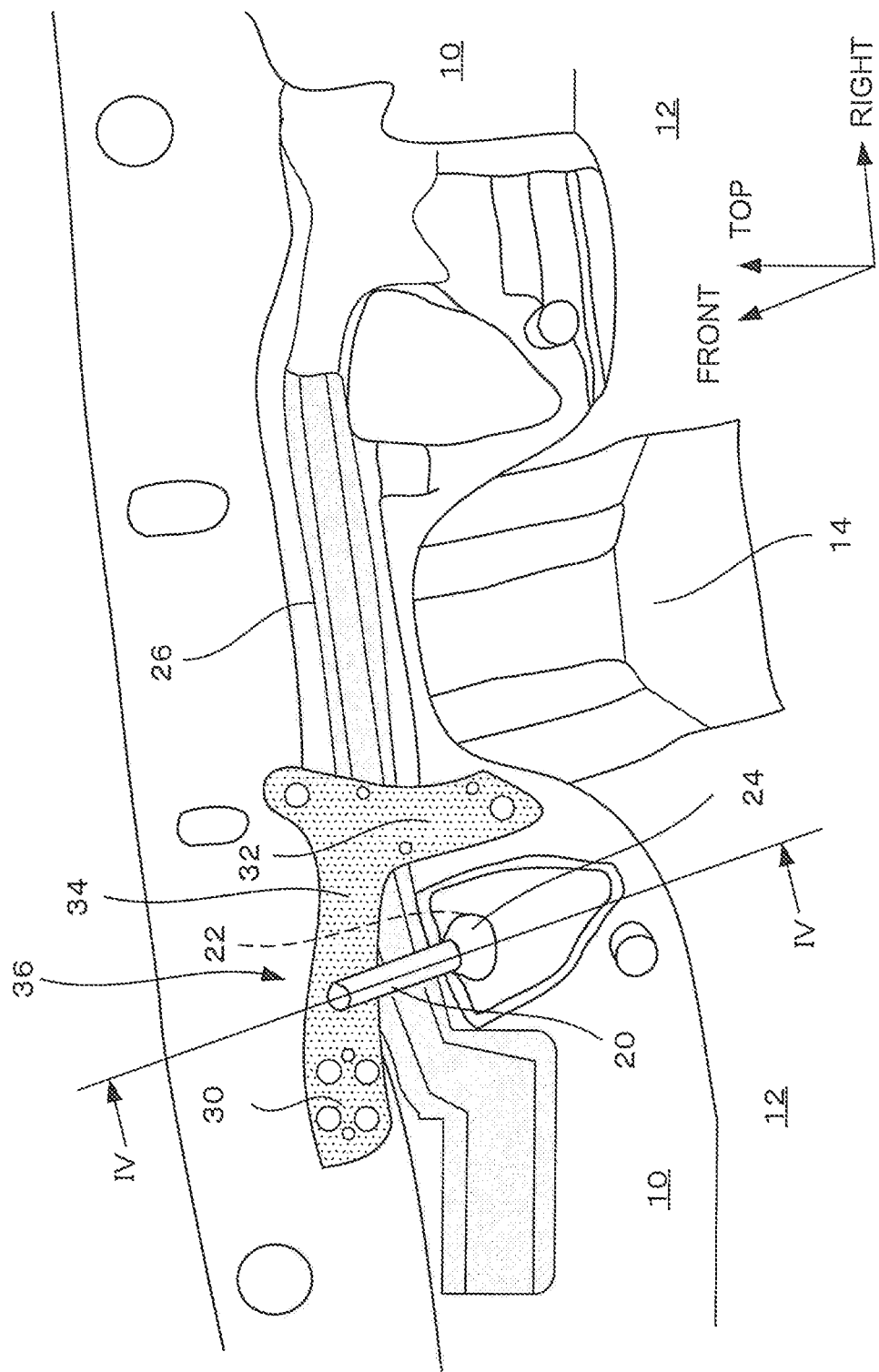
FIG. 1 is a diagram showing a cabin front wall structure of a vehicle according to an embodiment.

FIG. 1 shows a schematic structure of a vehicle cabin including a cabin front wall structure of a vehicle. A dash panel 10 is a panel member constituting a front wall of the cabin, and is arranged over the entire width of the vehicle cabin in a vehicle width direction. In general, the dash panel 10 is composed of a steel material. A floor panel 12 extending rearward is placed at a lower end of the dash panel 10. A middle region in the vehicle width direction of the vehicle cabin has a floor tunnel 14 which extends from the dash panel 10 toward the rear. The floor tunnel 14 is protruded from the floor panel 12 so as to define a tunnel-shaped space below the floor panel 12.

A driver seat is located on a left side of the floor tunnel 14, in which a steering column 20 is arranged. In FIG. 1, a portion of the steering column 20 protruded from the dash panel 10 is partially shown.

An upper end of the steering column 20 is connected to a steering wheel, while a lower end of the steering column 20 is connected to a mechanism for changing an angle of wheels through a steering gear box which houses a rack and pinion and other components. Accordingly, steering of the vehicle is caused when a driver rotates the steering wheel.

The steering column 20 extends through a column hole 22 defined in the dash panel 10 toward a front compartment (an engine compartment) side. In FIG. 1, the column hole 22 is indicated by a broken leader line. A bush 24 composed of an elastic material is inserted into a space between the column hole 22 and the steering column 20.

A dash cross member 26 which is a reinforcement member extending along a lateral direction of the dash panel 10 is disposed on an upper portion of the dash panel 10. Both upper and lower end portions of the dash cross member 26 are joined to the dash panel 10, and a middle portion of the dash cross member 26 is slightly spaced from a surface of the dash panel 10. In this example, a left end portion of the dash cross member 26 is broadened along a vertical direction, and thus increased in area. The dash cross member 26 is typically composed of a steel material.

A brake bracket 30 is arranged on a diagonally upward left side (a left side in the vehicle width direction) of the column hole 22. The brake bracket 30 is attached to the dash panel 10, and a brake pedal is attached to the brake bracket 30. An accelerator bracket 32 is arranged on a right side (a right side in the vehicle width direction) of the column hole 22. The accelerator bracket 32 is attached to the dash panel 10, and an accelerator pedal is attached to the accelerator bracket 32.

The brake bracket 30 and the accelerator bracket 32 are placed on opposite sides of the column hole 22 so as to be spaced from each other. Further, in this embodiment a brace 34 is provided as a connection member for connecting the brake bracket 30 and the accelerator bracket 32. In this embodiment, the brake bracket 30, the accelerator bracket 32, and the brace 34 are integrated into one piece so as to constitute, as a whole, a dash brace 36 in the shape of an inverted letter L which is open downward. When the brake bracket 30, the accelerator bracket 32, and the brace 34 are integrated into the dash brace 36, the two brackets can be simultaneously attached only by attaching the dash brace 36 to the dash panel 10, which can facilitate attachment work. It should be noted that the brackets and the brace may be formed as separate components which may be joined together by welding or other methods. The dash brace 36 is typically formed of a steel material.

The brace 34 which is placed in the vicinity of the upper portion of the dash panel 10 functions as a reinforcement member for reinforcing the dash panel 10. Meanwhile, the dash cross member 26 is placed under the brace 34 so as to cross the brace 34 in the lateral direction. Because of this, both a part of the dash cross member 26 and the brace 34 can function to reinforce the dash panel 10. It should be noted that the dash cross member 26 may overlap with at least one of the brake bracket 30, the accelerator bracket 32, and the brace 34.

Here, the brace 34 is arranged so as to extend from an upper left side to a right side of the column hole 22. A portion of the dash panel 10 around the column hole 22 is decreased in strength due to the presence of the column hole 22. The brace 34 provided close to the column hole 22 can reinforce the decreased strength of the portion of the dash panel 10 located above the column hole 22. In the example of FIG. 1 in which the brace 34 partially overlaps with the dash cross member 26, a rear surface of the brace 34 is generally located at a position slightly spaced from a surface of the dash cross member 26.

Figure 2:
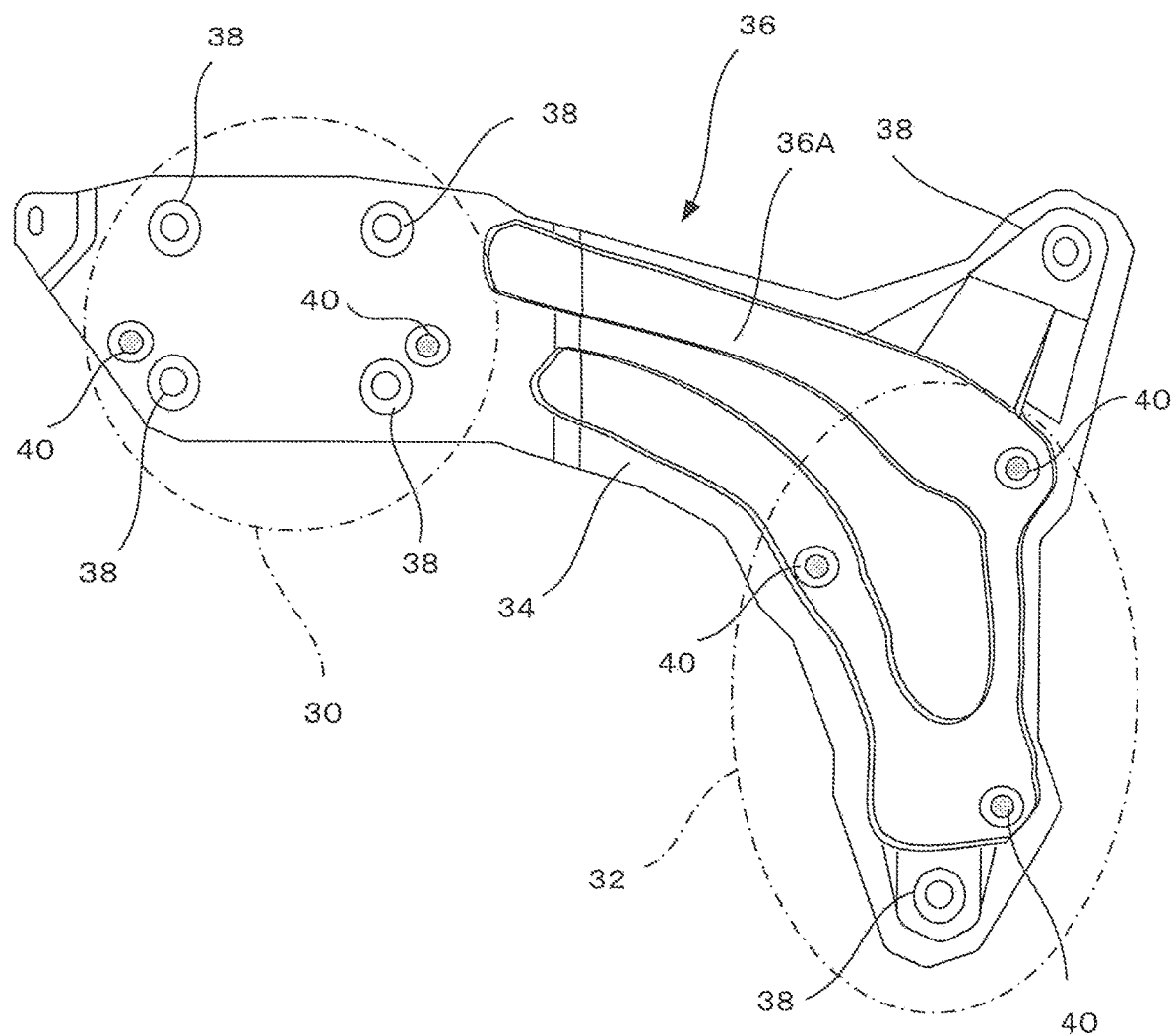
FIG. 2 is a diagram showing a structure of a connection member (a brace)

FIG. 2 shows the structure of an integrated type of the dash brace 36. Four attachment holes 38 are defined in the brake bracket 30, and the brake bracket 30 is, on its underside, bolt connected to the dash panel 10 through the attachment hole 38. Further, the brake bracket 30 is, on its front side, joined to a component of the brake pedal. A right portion of the brace 34 is extended slightly upward so as to form a region where another attachment hole 38 is defined to enable bolt connection between the dash brace 36 and the dash panel 10. In addition, a further attachment hole 38 is defined in a lower end portion of the accelerator bracket 32 to enable additional bolt connection between the dash brace 36 and the dash panel 10.

The brake bracket 30 is provided with two attachment bolts 40, by which the component of the brake pedal is fastened to the brake bracket 30. Meanwhile, the accelerator bracket 32 is equipped with three attachment bolts 40, by which the component of the accelerator pedal is fastened to the accelerator bracket 32.

It should be noted that the dash brace 36 includes a protruded region 36A as appropriate so as to be strengthened compared to a flat plate. In an example shown in FIG. 2, two laterally extending portions of the protruded region 36A are formed on a laterally extending portion of the brace 34, and the remaining other portion of the protruded region 36A is formed so as to surround a portion of the accelerator bracket 32, the accelerator pedal being attached to this portion.

Figure 3:
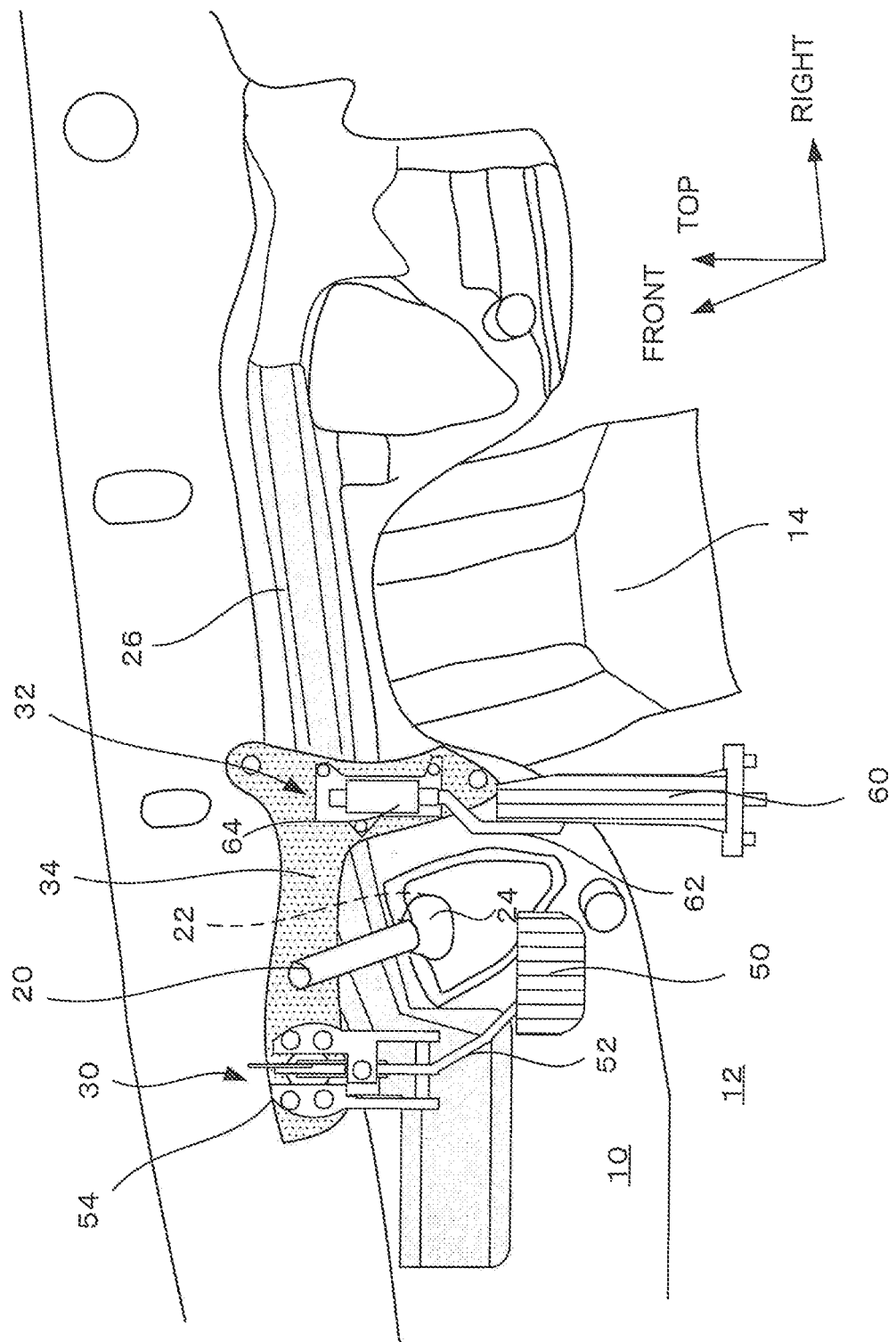
FIG. 3 is a diagram showing the cabin front wall structure of a vehicle according to the embodiment in a state where a pedal has been attached.

FIG. 3 shows the schematic structure of the vehicle cabin including the cabin front wall structure of a vehicle as in the case of FIG. 1, but in a state where a brake pedal 50 and an accelerator pedal 60 are attached to the cabin front wall structure.

The brake pedal 50 is a component that is stepped on by a driver for braking, and is connected via a connection bar 52 to a brake operating unit 54. The brake operating unit 54 transfers an operation amount associated with the brake pedal 50 to a brake controlling mechanism in response to movement of the brake pedal 50 which is stepped on. For example, the brake operating unit 54 transfers, as the operation amount of braking, a change in hydraulic pressure corresponding to an extent to which the brake pedal 50 is stepped on.

The accelerator pedal 60 is a component stepped on by the driver for acceleration, and is connected via a connection bar 62 to an operation detector 64. The operation detector 64 detects an operation amount associated with the accelerator pedal 60 in response to movement of the accelerator pedal 60 which is stepped on, and transfers the detected operation amount to a component for controlling outputs from an engine, a motor and the like. For example, the operation detector 64 transfers, as an output torque command, an electric signal indicative an extent to which the accelerator pedal 60 is stepped on.

CROSS SECTION STRUCTURE

Figure 4:
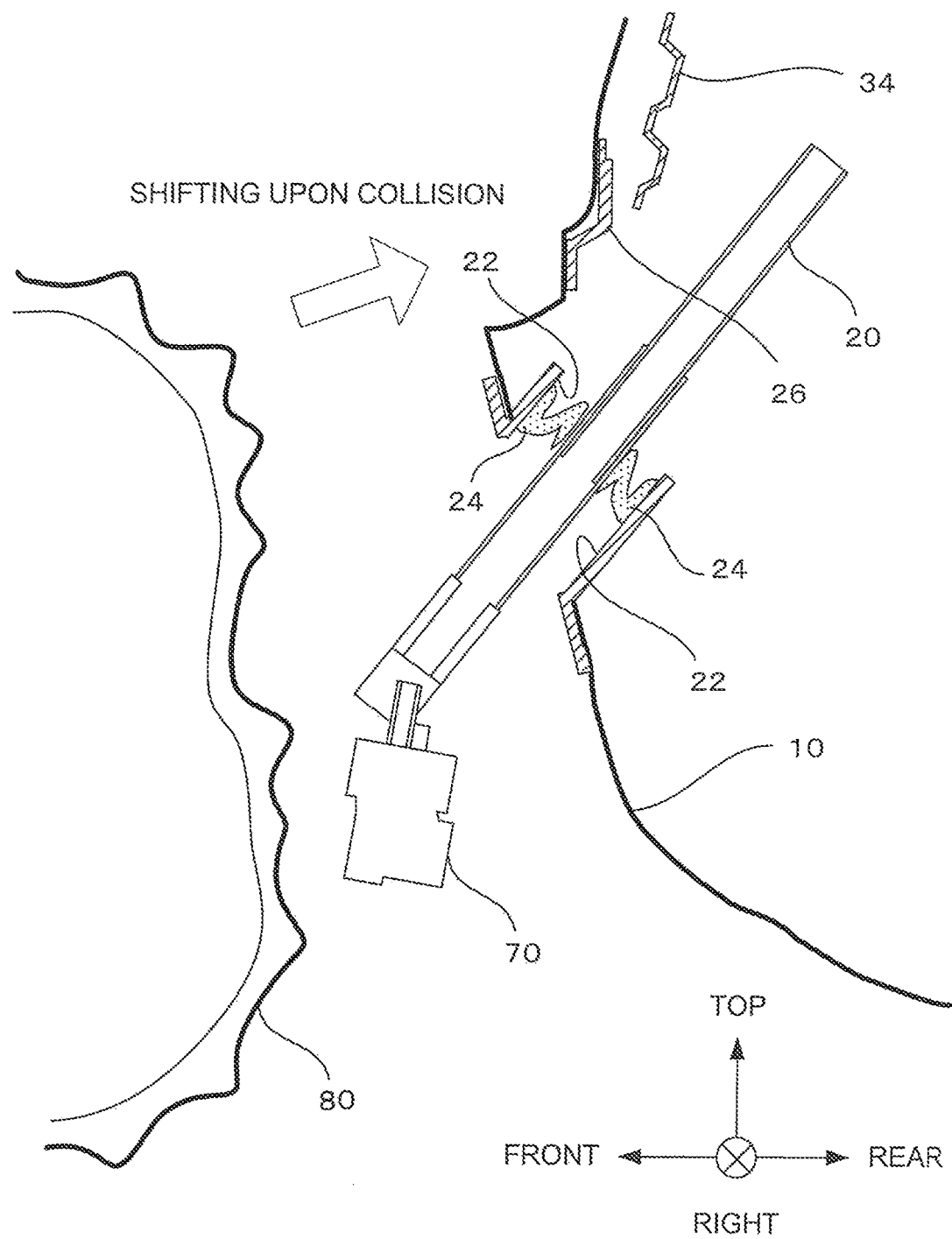
FIG. 4 is a cross section view taken along line IV-IV indicated in FIG. 1.

FIG. 4 shows a cross section view taken along line IV-IV indicated in FIG. 1.

The steering column 20 is extended through the inside of the bush 24 housed in the column hole 22, and a tip end of the steering column 20 is connected to a gear box 70. Orientation of wheels is controlled via the gear box 70.

A part of the dash cross member 26 is located above the column hole 22, while the brace 34 in the dash brace 36 is located at a position rearward (on an inner side in the vehicle cabin) of the dash cross member 26, and partially overlaps with the dash cross member 26.

A transaxle unit 80 is disposed in a front compartment (engine compartment) located forward of the vehicle cabin. Upon the occurrence of a collision (head-on collision) of the vehicle, the transaxle unit 80 is shifted diagonally rearward (and slightly upward) as indicated by a hollow arrow in FIG. 4. This may cause a rear wall of the transaxle unit 80 to bump on a portion of the dash panel 10 above the column hole 22. The portion of the dash panel 10 above the column hole 22 has a decreased strength due to the presence of the column hole 22. However, in this embodiment, both the dash cross member 26 and the brace 34 are provided on the portion of the dash panel 10. Because of this, the transaxle unit 80 can be effectively prevented from moving toward a cabin side.

As particularly shown in FIG. 1, the dash cross member 26 and the dash brace 36 extend along different directions in such a manner that the dash cross member 26 extends laterally in the vehicle width direction, while the dash brace 36 extends obliquely from upper left to lower right in the vehicle width direction. This can produce an effect such that an intersecting region where the dash cross member 26 and the dash brace 36 overlap with each other is effectively increased in strength.

The invention claimed is:

1. A cabin front wall structure of a vehicle, comprising:
   a dash panel constituting a front wall of a cabin of a vehicle;
   an accelerator bracket attached to the dash panel, and used for mounting an accelerator pedal;
   a brake bracket attached to the dash panel at a position spaced from the accelerator bracket in a vehicle width direction, and used for mounting a brake pedal; and
   a connection member extending along a surface of the dash panel and configured to connect the accelerator bracket and the brake bracket, the connection member is disposed between the dash panel and the brake bracket and the accelerator bracket,
   wherein the dash panel has a column hole into which a steering column is inserted;
   wherein the accelerator bracket is arranged on a right side of the column hole in the vehicle width direction;
   wherein the brake bracket is arranged on a left side of the column hole in the vehicle width direction; and
   wherein the connection member is arranged above the column hole.

2. A cabin front wall structure of a vehicle, comprising:
   a dash panel constituting a front wall of a cabin of a vehicle;
   an accelerator bracket attached to the dash panel, and used for mounting an accelerator pedal;
   a brake bracket attached to the dash panel at a position spaced from the accelerator bracket in a vehicle width direction, and used for mounting a brake pedal;
   a connection member extending along a surface of the dash panel and configured to connect the accelerator bracket and the brake bracket; and
   a reinforcement member extending along the vehicle width direction while conforming to the dash panel,
   wherein the reinforcement member is disposed so as to overlap with at least one of the connection member, the accelerator bracket, and the brake bracket;
   wherein the dash panel has a column hole into which a steering column is inserted;
   wherein the accelerator bracket is arranged on a right side of the column hole in the vehicle width direction;
   wherein the brake bracket is arranged on a left side of the column hole in the vehicle width direction; and
   wherein the connection member is arranged above the column hole.

* * * * *